(12) United States Patent
Hwang et al.

(10) Patent No.: US 10,852,592 B2
(45) Date of Patent: Dec. 1, 2020

(54) LIQUID CRYSTAL DISPLAY DEVICE INCLUDING LIQUID CRYSTAL CAPSULE AND METHOD OF FABRICATING THE SAME

(71) Applicant: LG Display Co., Ltd., Seoul (KR)

(72) Inventors: Jung-Im Hwang, Paju-si (KR); Hyun-Sook Jeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 27 days.

(21) Appl. No.: 16/108,914

(22) Filed: Aug. 22, 2018

(65) Prior Publication Data

US 2019/0072824 A1 Mar. 7, 2019

(30) Foreign Application Priority Data

Sep. 7, 2017 (KR) .................. 10-2017-0114449

(51) Int. Cl.
*G02F 1/1343* (2006.01)
*G02F 1/1335* (2006.01)
*G02F 1/1337* (2006.01)
*G09G 3/36* (2006.01)
*G02F 1/1334* (2006.01)

(52) U.S. Cl.
CPC ...... *G02F 1/134309* (2013.01); *G02F 1/1334* (2013.01); *G02F 1/1337* (2013.01); *G02F 1/133553* (2013.01); *G09G 3/3607* (2013.01); *G02F 2201/121* (2013.01); *G02F 2201/123* (2013.01); *G02F 2201/305* (2013.01); *G02F 2203/10* (2013.01); *G02F 2203/34* (2013.01)

(58) Field of Classification Search
CPC ............. G02F 1/134309; G02F 1/1334; G02F 1/1337; G02F 1/133553; G02F 2203/10; G02F 2203/34; G02F 2201/121; G02F 2201/123; G02F 2201/305; G09F 9/302; G09G 3/3607
USPC ......................................... 349/139
See application file for complete search history.

(56) References Cited

U.S. PATENT DOCUMENTS

| | | | |
|---|---|---|---|
| 2006/0245040 A1* | 11/2006 | Betrabet | G02F 1/133377 359/318 |
| 2014/0160403 A1* | 6/2014 | Xie | G02F 1/134363 349/96 |
| 2015/0109547 A1* | 4/2015 | Kim | G02F 1/133305 349/12 |
| 2017/0212387 A1* | 7/2017 | Kang | G02F 1/1334 |

OTHER PUBLICATIONS

Franklin et al., "Polarization-independent actively turnable colour generation on imprinted plasmonic sufaces", Nature Communications, 6:7337, DOI: 10.1038/ncomms8337, pp. 1-8, Jun. 11, 2015.

* cited by examiner

*Primary Examiner* — Nathanael R Briggs
*Assistant Examiner* — William D Peterson
(74) *Attorney, Agent, or Firm* — Morgan, Lewis & Bockius LLP

(57) ABSTRACT

A liquid crystal display device is disclosed. The liquid crystal display device includes a first substrate, and a plurality of grooves periodically spaced apart from each other over the first substrate. The liquid crystal display device also includes a pixel electrode and a common electrode spaced apart from each other over the first substrate, and a liquid crystal layer including a plurality of liquid crystal capsules on the grooves.

20 Claims, 6 Drawing Sheets

10

110

310

410

LIQUID CRYSTAL DISPLAY DEVICE INCLUDING LIQUID CRYSTAL CAPSULE AND METHOD OF FABRICATING THE SAME

CROSS-REFERENCE TO RELATED APPLICATION

This application claims the priority from and the benefit of Korean Patent Application No. 10-2017-0114449, filed in the Republic of Korea on Sep. 7, 2017, which is hereby incorporated by reference in its entirety for all purposes as if fully set forth herein.

BACKGROUND

1. Technical Field

The present disclosure relates to a liquid crystal display device, and more particularly, to a liquid crystal display device configured to display a color using a liquid crystal layer including a periodic pattern of a nano size and a liquid crystal capsule, and a method of fabricating the liquid crystal display device.

2. Discussion of the Related Art

With rapid development of information technologies, display devices for processing and displaying a large amount of information are being developed. For example, various flat panel displays (FPDs) having a thin profile, a light weight, and a low power consumption have been researched.

As a result, a thin film transistor liquid crystal display (TFT-LCD) having an excellent color reproducibility and a thin profile has been developed. The LCD device displays an image using an optical anisotropy and a polarization property of a liquid crystal molecule.

In general, the LCD device displays a color image by using a color filter layer. However, transmittance of the LCD device may be reduced and a fabrication process may be complicated by the color filter layer. To alleviate this potential drawback, a plasmon LCD device that displays a color image by using a metal layer having a nano-sized periodic pattern thereon and a liquid crystal layer has been suggested.

FIGS. 1A and 1B are cross-sectional views showing an OFF state and an ON state, respectively, of a plasmon liquid crystal display device according to the related art.

In FIGS. 1A and 1B, a plasmon liquid crystal display (LCD) device 10 according to the related art includes first and second substrates 20 and 40, and a liquid crystal layer 60 including liquid crystal molecules 62 between the first and second substrates 20 and 40.

A pixel electrode 22 is disposed on an inner surface of the first substrate 20, and a first alignment layer 26 is disposed on the pixel electrode 22. The pixel electrode 22 includes a metallic material, and a plurality of grooves 24 of a nano size having a periodicity are formed on a top surface of the pixel electrode 22. The plurality of grooves 24 are periodically spaced apart from each other along four directions to have a diameter D and a period P of several hundred nanometers in a plan view.

A common electrode 42 is disposed on an inner surface of the second substrate 40, and a second alignment layer 44 is disposed on the common electrode 42.

The plasmon LCD device 10 may display a color image by using a surface plasmon due to the plurality of grooves 24 of the pixel electrode 22. A plasmon is a pseudo particle representing a collective oscillation of free electrons in a metal. Since the plasmon exists locally on a surface of a metal pattern of a nano size, the plasmon may be referred to as a surface plasmon.

If a dielectric layer is formed on the metal pattern of a nano size, a light incident on the dielectric layer passes through the dielectric layer and then reflects on the metal pattern. A light of a specific wavelength is absorbed. A light of a wavelength other than the specific wavelength is selectively reflected due to a coupling of an electric field of the incident light within a wavelength band of a visible ray to a wavelength band of a near infrared ray and the plasmon.

In FIGS. 1A and 1B, if a first light L1 of a full wavelength band enters the plasmon LCD device 10, the first light L1 passes through the second substrate 40, the common electrode 42, the second alignment layer 44, the liquid crystal layer 60, and the first alignment layer 26, and reflects on the pixel electrode 22. A second light L2 of a wavelength band other than a specific wavelength is selectively reflected due to a coupling of an electric field of the first light L1 and the plasmon of the pixel electrode 22.

The first light L1 of a white color enters the plasmon LCD device 10, and the second light L2 of a specific color is emitted from the plasmon LCD device 10.

The specific wavelength absorbed by the plurality of grooves 24 of the pixel electrode 22 may be expressed by the following Equation 1:

$$\frac{2\pi}{\lambda} = \frac{P}{\sqrt{i^2 + j^2}} \sqrt{\frac{\varepsilon_{Al}\varepsilon_{LC}}{\varepsilon_{Al} + \varepsilon_{LC}}} \quad \text{[Equation 1]}$$

Here, $\lambda$ is a wavelength of a light absorbed by the pixel electrode 22, P is a period of the plurality of grooves 24, each of i and j is a mode order, $\varepsilon_{Al}$ is a dielectric constant (electric permittivity) of aluminum of the pixel electrode 22, and $\varepsilon_{LC}$ is a dielectric constant of the liquid crystal layer 60.

In the plasmon LCD device 10, since the liquid crystal molecule 62 has different arrangements between an OFF state where a voltage V is not applied and an ON state where the voltage V is applied, the liquid crystal layer 60 has a dielectric constant in the ON state different from that in the OFF state. Thus, a wavelength of the light absorbed by the pixel electrode 22 is changed according to the voltage V applied to the liquid crystal layer 60.

As a result, in the plasmon LCD device 10, the wavelength band of the second light L2 reflecting on the pixel electrode 22 may be controlled by the voltage V applied to the liquid crystal layer 60 to display a color image.

In the plasmon LCD device 10, the first and second alignment layers 26 and 44 are formed for an initial alignment of the liquid crystal layer 60. Since the first and second alignment layers 26 and 44 are formed through a process including coating and rubbing of an alignment material such as polyimide PI, a fabrication process for the plasmon LCD device 10 is relatively complicated.

In addition, a degree of alignment of the plurality of grooves 24 of the pixel electrode 22 may be reduced due to the rubbing process of the first alignment layer 26.

Further, since the liquid crystal layer 60 includes the liquid crystal molecule 62 of a relatively high refractive index for a clear color, a response speed of the liquid crystal layer 60 may be reduced.

SUMMARY

Accordingly, embodiments of the present disclosure are directed to a liquid crystal display device and a method of fabricating the same that substantially obviate one or more of the problems due to limitations and disadvantages of the related art.

Aspects of the present disclosure relate to a liquid crystal display device including a liquid crystal capsule and a method of fabricating the liquid crystal display device.

One or more aspects of the present disclosure relate to a liquid crystal display device including a liquid crystal capsule and a method of fabricating the liquid crystal display device where a fabrication process is simplified, a fabrication cost is reduced, and potential reduction of a degree of alignment of a plurality of nano-sized grooves is mitigated by forming a liquid crystal layer including a liquid crystal capsule on the nano-sized grooves.

One or more aspects of the present disclosure relate to a liquid crystal display device including a liquid crystal capsule and a method of fabricating the liquid crystal display device where a color image is displayed with an increased response speed by controlling a wavelength band of a reflected light using a change of an average dielectric constant (electric permittivity) according to a re-arrangement of a liquid crystal molecule in a liquid crystal capsule.

Additional features and advantages of the present disclosure will be set forth in the description which follows, and in part will be apparent from the description, or may be learned by practice of the present disclosure. The objectives and other advantages of the present disclosure may be realized and attained by the structure particularly pointed out in the written description, or derivable therefrom, and claims hereof as well as the appended drawings.

To achieve these and other aspects of the inventive concepts, as embodied and broadly described, a liquid crystal display device comprises: a first substrate; a plurality of grooves periodically spaced apart from each other over the first substrate; a pixel electrode and a common electrode spaced apart from each other over the first substrate; and a liquid crystal layer including a plurality of liquid crystal capsules on the grooves.

In another aspect, a method of fabricating a liquid crystal display device comprises: forming a conductive layer having a plurality of grooves periodically spaced apart from each other over a first substrate; and forming a liquid crystal layer including a plurality of liquid crystal capsules on the conductive layer, one or more of the liquid crystal capsules having a plurality of liquid crystal molecules.

In yet another aspect, a liquid crystal display apparatus comprises: a first substrate; a conductive layer over the first substrate and having a plurality of grooves; and a liquid crystal layer including a plurality of liquid crystal capsules over the conductive layer, one or more of the liquid crystal capsules having a plurality of liquid crystal molecules.

It is to be understood that both the foregoing general description and the following detailed description are explanatory and by example, and are intended to provide further explanation of the aspects as claimed.

BRIEF DESCRIPTION OF THE DRAWINGS

The accompanying drawings, which are included to provide a further understanding of the present disclosure and which are incorporated in and constitute a part of this specification, illustrate embodiments of the present disclosure and together with the description serve to explain various principles of the present disclosure. In the drawings.

DETAILED DESCRIPTION

Figure 1A:
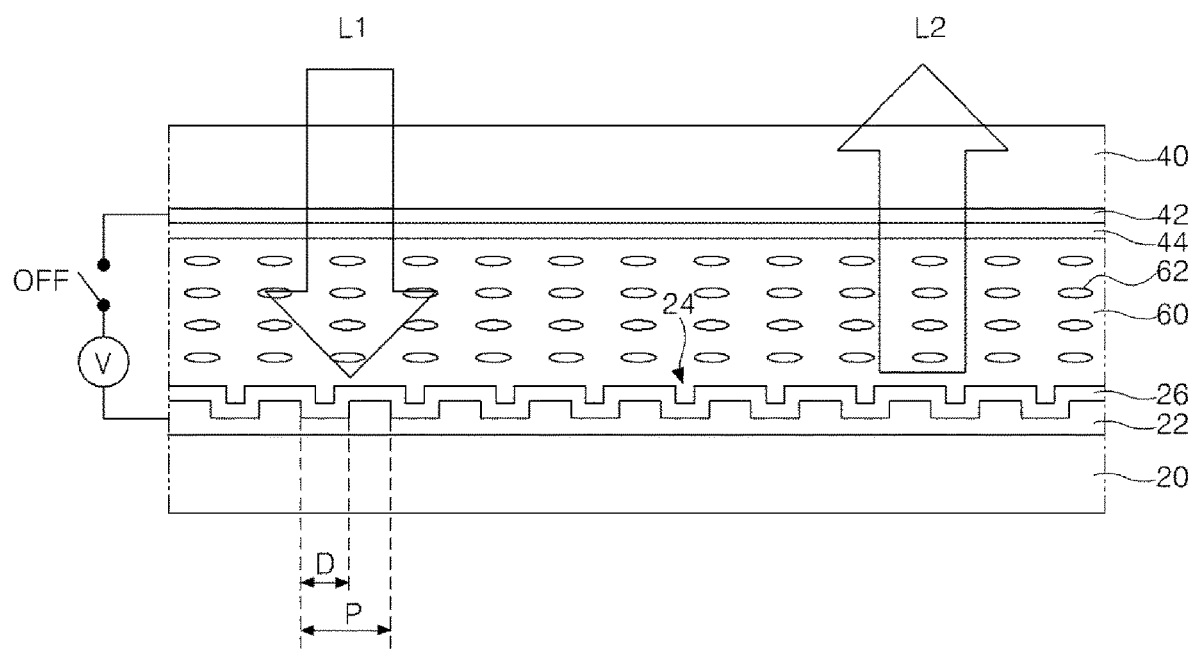
FIGS. 1A and 1B are cross-sectional views showing an OFF state and an ON state, respectively, of a plasmon liquid crystal display device according to the related art.
Figure 1B:
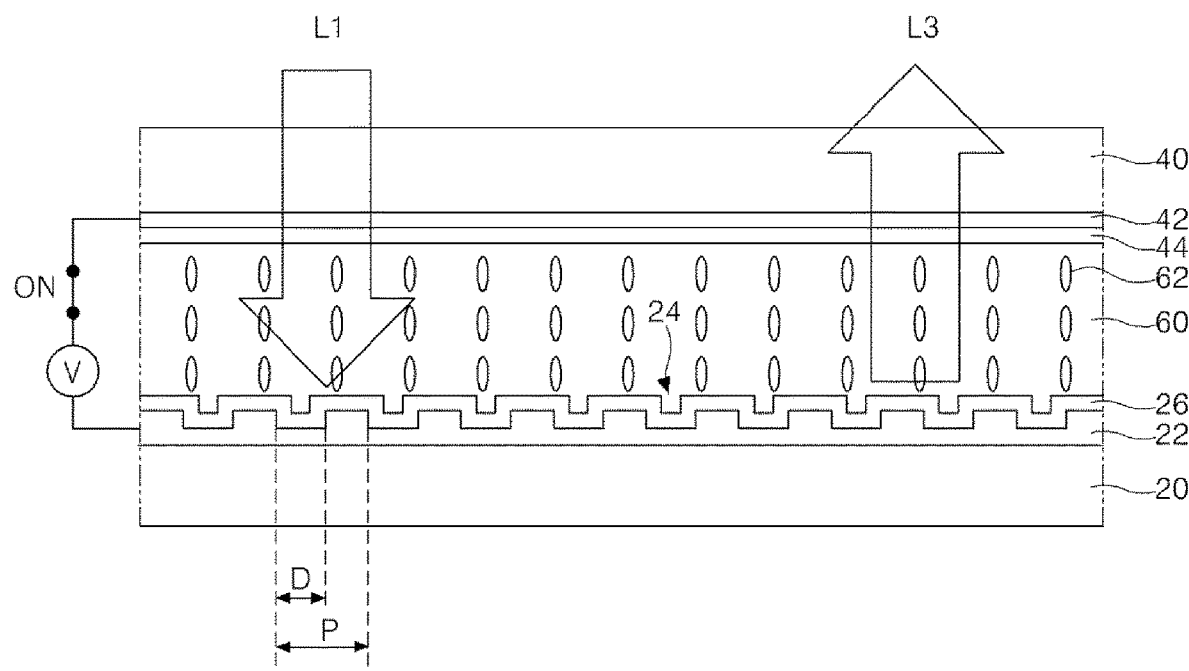

Reference will now be made in detail to aspects of the present disclosure, examples of which may be illustrated in the accompanying drawings. In the following description, a detailed description of functions or configurations already well known to those skilled in the art may be omitted. Unless otherwise specified, any particular sequence of processing steps and/or operations described herein is an example. The sequence of steps and/or operations is not limited to the particular sequence set forth herein and may be changed as is known in the art or would be understood by those skilled in the art, with the exception of steps and/or operations necessarily occurring in a certain order. Like reference numerals designate like elements throughout. Specific names of the respective elements used in the following detailed description are only for convenience of writing the specification and may thus be different from those used in any actual products.

Figure 2A:
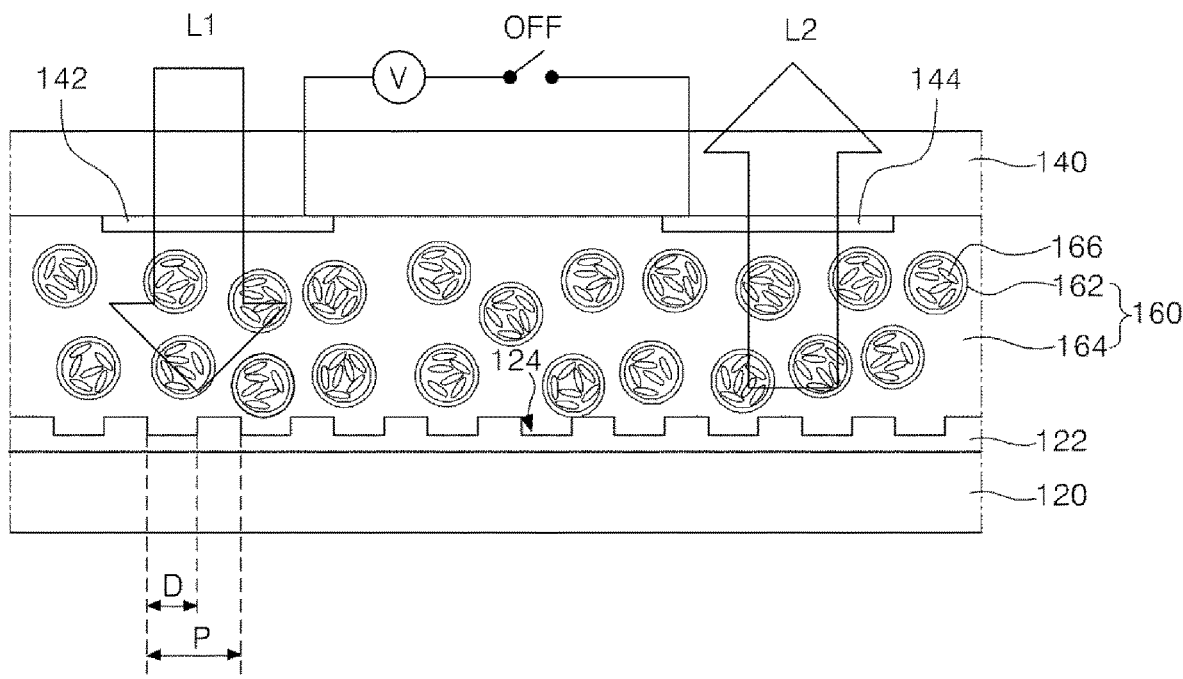
FIGS. 2A and 2B are cross-sectional views showing an OFF state and an ON state, respectively, of a liquid crystal display device including a liquid crystal capsule according to a first example embodiment of the present disclosure.
Figure 2B:
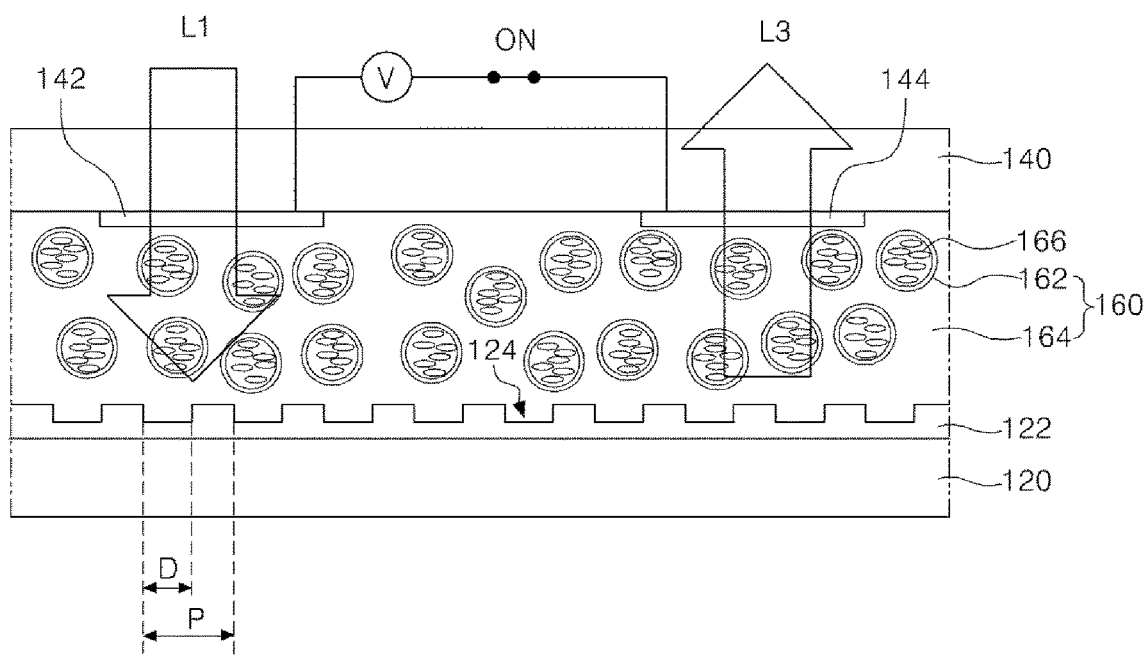

FIGS. 2A and 2B are cross-sectional views showing an OFF state and an ON state, respectively, of a liquid crystal display device including a liquid crystal capsule according to a first example embodiment of the present disclosure.

As illustrated in FIGS. 2A and 2B, a liquid crystal display (LCD) device 110 including a liquid crystal capsule according to a first embodiment of the present disclosure may include first and second substrates 120 and 140, and a liquid crystal layer 160 including a plurality of liquid crystal capsules 162 between the first and second substrates 120 and 140.

A metal layer (conductive layer) 122 may be disposed on an inner surface of the first substrate 120. The metal layer 122 may include a metallic material having a relatively high reflectance, such as aluminum (Al).

A plurality of grooves 124 of a nano size having a periodicity may be formed on a top surface of the metal layer 122. The plurality of grooves 124 may be periodically spaced apart from each other along four or more directions to have a diameter D and a period P of several hundred nanometers in a plan view.

A pixel electrode 142 and a common electrode 144 may be disposed on an inner surface of the second substrate 140. Each of the pixel electrode 142 and the common electrode 144 may include a transparent conductive material, such as indium tin oxide (ITO) or indium zinc oxide (IZO).

Each of the pixel electrode 142 and the common electrode 144 may have a bar shape in a plan view, and a horizontal electric field may be generated between the pixel electrode 142 and the common electrode 144 due to application of a voltage V.

Although not shown, the first substrate 120 or the second substrates 140 may include a plurality of pixels, and gate lines and data lines crossing each other to define the pixels. For example, the pixels, gate lines, and data lines may be disposed on the inner surface of the second substrate 140. A thin film transistor connected to a gate line and a data line, the pixel electrode 142, and the common electrode 144 may be disposed in each of the plurality of pixels.

Although the pixel electrode 142 and the common electrode 144 are shown as being disposed on the same underlying layer in the first example embodiment of FIGS. 2A and 2B, the pixel electrode and the common electrode may be disposed on different underlying layers, and may be formed from a different layer during manufacturing. For example, one of the pixel electrode and the common electrode may have a plate shape, and the other of the pixel electrode and the common electrode may have a bar shape. Also, one of the pixel electrode and the common electrode may be over the other of the pixel electrode and the common electrode.

The liquid crystal layer 160 may include a plurality of liquid crystal capsules 162 and a binder 164 in which the plurality of liquid crystal capsules 162 are dispersed. Each of the plurality of liquid crystal capsules 162 may include a plurality of liquid crystal molecules 166.

For example, the liquid crystal layer 160 may have a thickness within a range of about 1 μm to about 4 μm.

Each of the plurality of liquid crystal capsules 162 may be a polymer capsule having a diameter of about 1 nm to about 999 nm (e.g., a diameter smaller than a wavelength of a visible ray). For example, each liquid crystal capsule 162 may include a water soluble material, such as poly vinyl alcohol (PVA), or a fat soluble material, such as poly methyl methacrylate (PMMA). Each liquid crystal capsule 162 may have a diameter within a range of about 1 nm to about 320 nm.

The binder 164 may be transparent or opaque. The binder 164 may have a water solubility, a fat solubility, or a mixed property of a water solubility and a fat solubility.

The plurality of liquid crystal molecules 166 may include at least one of a nematic liquid crystal molecule, a ferroelectric liquid crystal molecule, and a flexo electric liquid crystal molecule.

The liquid crystal layer 160 may be formed through a soluble process including coating, drying, and curing of a liquid crystal capsule solution including the plurality of liquid crystal capsules 162.

Here, since the liquid crystal layer 160 including the plurality of liquid crystal capsules 162 is formed without an additional alignment layer, the liquid crystal layer 160 including the plurality of liquid crystal capsules 162 may directly contact the metal layer 122, the pixel electrode 142, and the common electrode 144.

In an OFF state of FIG. 2A where a voltage V is not applied between the pixel electrode 142 and the common electrode 144, a horizontal electric field is not generated between the pixel electrode 142 and the common electrode 144. As a result, the plurality of liquid crystal molecules 166 in the plurality of liquid crystal capsules 162 of the liquid crystal layer 160 are not re-aligned by the horizontal electric field and may be randomly aligned as in an initial state.

In an ON state of FIG. 2B where a voltage V is applied between the pixel electrode 142 and the common electrode 144, a horizontal electric field is generated between the pixel electrode 142 and the common electrode 144. As a result, the plurality of liquid crystal molecules 166 in the plurality of liquid crystal capsules 162 of the liquid crystal layer 160 may be re-aligned by the horizontal electric field to be uniformly (horizontally or vertically) aligned. Although the plurality of liquid crystal molecules 166 are re-aligned horizontally (parallel to the horizontal electric field) in FIG. 2B, the plurality of liquid crystal molecules 166 may be re-aligned vertically (perpendicular to the horizontal electric field) in another embodiment.

The liquid crystal layer 160 may have a different average dielectric constant in the OFF state where the plurality of liquid crystal molecules 166 are randomly aligned in the liquid crystal capsule 162 from an average dielectric constant in the ON state where the plurality of liquid crystal molecules 166 are uniformly aligned in the liquid crystal capsules 162.

Figure 3:
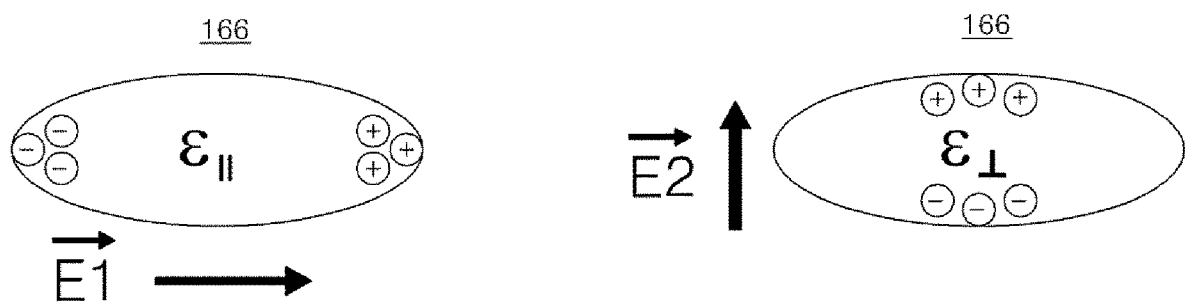
FIG. 3 is a view showing a horizontal dielectric constant and a vertical dielectric constant of a liquid crystal molecule of a liquid crystal display device including a liquid crystal capsule according to a first example embodiment of the present disclosure.

FIG. 3 is a view respectively showing a horizontal dielectric constant and a vertical dielectric constant of a liquid crystal molecule of a liquid crystal display device including a liquid crystal capsule according to a first example embodiment of the present disclosure.

In FIG. 3, when a first electric field E1 parallel to a long axis of a liquid crystal molecule 166 is applied to the liquid crystal molecule 166, a hole (+) and an electron (−) of the liquid crystal molecule 166 are polarized to end portions of the long axis, and the liquid crystal molecule 166 has a horizontal dielectric constant (electric permittivity) $\varepsilon_{//}$.

In addition, when a second electric field E2 perpendicular to the long axis of the liquid crystal molecule 166 is applied to the liquid crystal molecule 166, the hole (+) and the electron (−) of the liquid crystal molecule 166 are polarized to end portions of a short axis, and the liquid crystal molecule 166 has a vertical dielectric constant (electric permittivity) $\varepsilon_\perp$.

A difference between the horizontal dielectric constant $\varepsilon_{//}$ and the vertical dielectric constant $\varepsilon_\perp$ of the liquid crystal molecule 166 is defined as a dielectric constant anisotropy ($\Delta\varepsilon$). The liquid crystal molecule having a positive dielectric constant anisotropy ($\Delta\varepsilon>0$) may be referred to as a positive liquid crystal, and the liquid crystal molecule having a negative dielectric constant anisotropy ($\Delta\varepsilon<0$) may be referred to as a negative liquid crystal. The liquid crystal molecule of the positive liquid crystal is aligned parallel to the electric field, and the liquid crystal molecule of the negative liquid crystal is aligned perpendicular to the electric field.

In the OFF state of the FIG. 2A, the plurality of liquid crystal molecules 166 in the liquid crystal capsule 162 may be randomly aligned. An average dielectric constant of the liquid crystal layer 160 in the OFF state may be expressed by the following Equation 2:

$$\varepsilon_{LC}(OFF) = \frac{1}{3}(\varepsilon_{||} + 2\varepsilon_\perp) \qquad \text{[Equation 2]}$$

Here, $\varepsilon_{LC}(OFF)$ is an average dielectric constant (electric permittivity) of the liquid crystal layer 160 in the OFF state, $\varepsilon_{//}$ is a horizontal dielectric constant of the liquid crystal molecule 166, and $\varepsilon_\perp$ is a vertical dielectric constant of the liquid crystal molecule 166.

In the ON state of FIG. 2B, the plurality of liquid crystal molecules 166 having a positive dielectric constant anisotropy ($\Delta\varepsilon>0$) in the liquid crystal capsule 162 are aligned parallel to a horizontal electric field, and an average dielectric constant ($\varepsilon_{LC}$(ON)) of the liquid crystal layer 160 in the ON state may become the horizontal dielectric constant ($\varepsilon_{//}$):

$$(\varepsilon_{LC}(ON)=\varepsilon_{//})\qquad\text{[Equation 3]}$$

Further, in the ON state of FIG. 2B, the plurality of liquid crystal molecules 166 having a negative dielectric constant anisotropy ($\Delta\varepsilon<0$) in the liquid crystal capsule 162 are aligned perpendicular to the horizontal electric field, and an average dielectric constant ($\varepsilon_{LC}$(ON)) in the liquid crystal layer 160 of the ON state may become the vertical dielectric constant ($\varepsilon_\perp$):

$$(\varepsilon_{LC}(ON)=\varepsilon_\perp)\qquad\text{[Equation 4]}$$

The average dielectric constant ($\varepsilon_{LC}$(ON)) of the liquid crystal layer 160 in the ON state is the same as a greater one of the horizontal dielectric constant ($\varepsilon_{//}$) and the vertical dielectric constant ($\varepsilon_\perp$) of the liquid crystal molecule 166. The average dielectric constant ($\varepsilon_{LC}$(OFF)) of the liquid crystal layer 160 in the OFF state and the average dielectric constant ($\varepsilon_{LC}$(ON)) of the liquid crystal layer 160 in the ON state are different from each other.

For example, if the plurality of liquid crystal molecules 166 having a positive dielectric constant anisotropy ($\Delta\varepsilon>0$) are disposed in the plurality of liquid crystal capsules 162 of the liquid crystal layer 160, the average dielectric constant of the liquid crystal layer 160 in the OFF state may be smaller than the average dielectric constant of the liquid crystal layer 160 in the ON state, i.e., the horizontal dielectric constant ($\varepsilon_{//}$):

$$(\varepsilon_{LC}(OFF)<\varepsilon_{LC}(ON)=\varepsilon_{//})\qquad\text{[Equation 5]}$$

If the plurality of liquid crystal molecules 166 having a negative dielectric constant anisotropy ($\Delta\varepsilon<0$) are disposed in the plurality of liquid crystal capsules 162 of the liquid crystal layer 160, the average dielectric constant of the liquid crystal layer 160 in the OFF state may be smaller than the average dielectric constant of the liquid crystal layer 160 in the ON state, i.e., the vertical dielectric constant ($\varepsilon_\perp$):

$$(\varepsilon_{LC}(OFF)<\varepsilon_{LC}(ON)=\varepsilon_\perp)\qquad\text{[Equation 6]}$$

The LCD device 110 including the liquid crystal capsule according to a first example embodiment of the present disclosure may display a color image by using a surface plasmon due to the plurality of grooves 124 of the metal layer 122.

When a first light L1 of a full wavelength band enters the LCD device 110 including the liquid crystal capsule, the first light L1 passes through the second substrate 140 and the liquid crystal layer 160 and reflects on the metal layer 122. A second light L2 of a wavelength band other than a predetermined wavelength may be selectively reflected due to a coupling of an electric field of the first light L1 and the plasmon of the metal layer 122.

The first light L1 of a white color may enter the LCD device 110 including the liquid crystal capsule, and the second light L2 of a predetermined color may be emitted from the LCD device 110 including the liquid crystal capsule.

The predetermined wavelength absorbed by the plurality of grooves 124 of the metal layer 122 in the OFF state and in the ON state may be expressed by following Equations 7 and 8, respectively:

$$\frac{2\pi}{\lambda(OFF)} = \frac{P}{\sqrt{i^2+j^2}} \sqrt{\frac{\varepsilon_{122}\varepsilon_{LC}(OFF)}{\varepsilon_{122}+\varepsilon_{LC}(OFF)}}\qquad\text{[Equation 7]}$$

$$\frac{2\pi}{\lambda(ON)} = \frac{P}{\sqrt{i^2+j^2}} \sqrt{\frac{\varepsilon_{122}\varepsilon_{LC}(ON)}{\varepsilon_{122}+\varepsilon_{LC}(ON)}}\qquad\text{[Equation 8]}$$

Here, $\lambda$(ON) is a wavelength of a light absorbed by the metal layer 122 in the ON state, $\lambda$(OFF) is a wavelength of a light absorbed by the metal layer 122 in the OFF state, P is a period of the plurality of grooves 124, each of i and j is a mode order, E122 is a dielectric constant (electric permittivity) of the meal layer 122, $\varepsilon_{LC}$(OFF) is an average dielectric constant of the liquid crystal layer 160 in the OFF state, and $\varepsilon_{LC}$(ON) is an average dielectric constant of the liquid crystal layer 160 in the ON state.

In the LCD device 110 including the liquid crystal capsule according to a first example embodiment, since the wavelength $\lambda$(ON) of a light absorbed by the plurality of grooves 124 of the metal layer 122 in the ON state and the wavelength $\lambda$(OFF) of a light absorbed by the plurality of grooves 124 of the metal layer 122 in the OFF state are different from each other, a wavelength of the light absorbed by the plurality of grooves 124 of the metal layer 122 may be changed according to the voltage V applied to the liquid crystal layer 160.

As a result, in the LCD device 110 including the liquid crystal capsule 162 according to a first example embodiment, the wavelength band of the second light L2 reflecting on the metal layer 122 may be controlled by the voltage V applied to the pixel electrode 142 and the common electrode 144 to display a color image.

In the LCD device 110 including the liquid crystal capsule 162 according to a first example embodiment of the present disclosure, the liquid crystal layer 160 may be disposed on a top surface of the metal layer 122 having the plurality of grooves 124. The average dielectric constant of the liquid crystal layer 160 may be controlled by the voltage V applied to the pixel electrode 142 and the common electrode 144 to display a color image.

Since an alignment layer may be omitted, a fabrication process may be simplified, a fabrication cost may be reduced, and reduction in a degree of alignment of the plurality of grooves 124 may be mitigated or prevented.

Further, the wavelength of the light absorbed by the plurality of grooves 124 of the metal layer 122 may be controlled by the change of the average dielectric constant due to re-alignment of the liquid crystal molecule 166 in the liquid crystal capsule 162 of the liquid crystal layer 160 to increase the response speed.

While the metal layer having the plurality of grooves is illustrated, for example, in FIGS. 2A and 2B, as formed on the inner surface of the first substrate 120, and the pixel electrode and the common electrode are illustrated as formed on the inner surface of the second substrate 140 in the first example embodiment, a pixel electrode and a common electrode constituting a plurality of grooves may alternatively be formed on an inner surface of a first substrate in another example embodiment.

Figure 4:
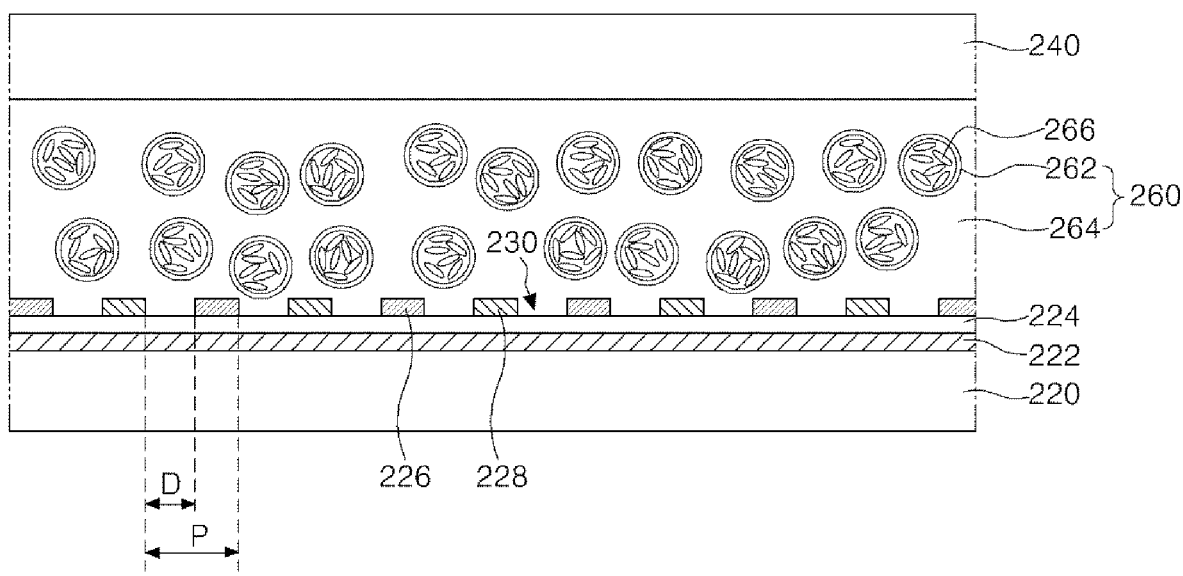
FIG. 4 is a cross-sectional view showing a liquid crystal display device including a liquid crystal capsule according to a second example embodiment of the present disclosure.

FIG. 4 is a cross-sectional view showing a liquid crystal display device including a liquid crystal capsule according to a second example embodiment of the present disclosure. Illustrations for the same part as the first example embodiment may be omitted.

In FIG. 4, a liquid crystal display (LCD) device 210 including a liquid crystal capsule according to a second example embodiment of the present disclosure may include first and second substrates 220 and 240, and a liquid crystal layer 260 including a plurality of liquid crystal capsules 262 between the first and second substrates 220 and 240.

A reflecting layer 222 may be disposed on an inner surface of the first substrate 220, and an insulating layer 224 may be disposed on the reflecting layer 222.

The reflecting layer 222 may include a metallic material having a relatively high reflectance, such as aluminum (Al). The insulating layer 224 may include an inorganic insulating material, such as silicon oxide ($SiO_2$) and silicon nitride (SiNx), or an organic insulating material, such as benzocyclobutene (BCB) and photoacryl.

A pixel electrode 226 and a common electrode 228 spaced apart from each other may be disposed on the insulating layer 224.

The pixel electrode 226, the common electrode 228, and the insulating layer 224 may constitute a plurality of grooves 230 of a nano size having a periodicity. The plurality of grooves 230 may be periodically spaced apart from each other along four or more directions to have a diameter D and a period P of several hundred nanometers in a plan view.

The pixel electrode 226 and the common electrode 228 may include a metallic material having a relatively high reflectance, such as aluminum (Al).

Each of the pixel electrode 226 and the common electrode 228 may have a bar shape in a plan view, and a horizontal electric field may be generated between the pixel electrode 226 and the common electrode 228 due to application of a voltage.

The liquid crystal layer 260 may include a plurality of liquid crystal capsules 262 and a binder 264 in which the plurality of liquid crystal capsules 262 are dispersed. Each of the plurality of liquid crystal capsules 262 may include a plurality of liquid crystal molecules 266.

The liquid crystal layer 260 may be formed through a soluble process including coating, drying, and curing of a liquid crystal capsule solution including the plurality of liquid crystal capsules 262.

The second substrate 240 may include a glass or a film. For example, after the liquid crystal layer 260 is formed on the second substrate 240 of a film type through a soluble process, the LCD device 210 may be completed by attaching the second substrate 240 having the liquid crystal layer 260 to the first substrate 220 having the pixel electrode 226 and the common electrode 228.

Here, since the liquid crystal layer 260 including the plurality of liquid crystal capsules 262 may be formed without an additional alignment layer, the liquid crystal layer 260 including the plurality of liquid crystal capsules 262 may directly contact the pixel electrode 226, the common electrode 228, and the second substrate 240.

Although not shown, the plurality of liquid crystal molecules 266 in the plurality of liquid crystal capsules 262 of the liquid crystal layer 260 may be randomly aligned in an OFF state, and may be uniformly aligned in an ON state.

Here, since the wavelength $\lambda(ON)$ of a light absorbed by the plurality of grooves 230 of the pixel electrode 226 and the common electrode 228 of the LCD device 210 in the ON state and the wavelength $\lambda(OFF)$ of a light absorbed by the plurality of grooves 230 of the pixel electrode 226 and the common electrode 228 of the LCD device 210 in the OFF state are different from each other, a wavelength of the light absorbed by the plurality of grooves 230 of the pixel electrode 226 and the common electrode 228 may be changed according to the voltage applied to the liquid crystal layer 260.

As a result, in the LCD device 210 including the liquid crystal capsule 262 according to a second example embodiment, the wavelength band of the light reflecting on the pixel electrode 226, the common electrode 228, and the reflecting layer 222 may be controlled by the voltage applied to the pixel electrode 226 and the common electrode 228 to display a color image.

In the LCD device 210 including the liquid crystal capsule 262 according to a second example embodiment of the present disclosure, the liquid crystal layer 260 may be disposed on the pixel electrode 226, the common electrode, 228 and the insulating layer 224 constituting the plurality of grooves 230. The average dielectric constant of the liquid crystal layer 260 may be controlled by the voltage applied to the pixel electrode 226 and the common electrode 228 to display a color image.

Since an alignment layer may be omitted, a fabrication process may be simplified, a fabrication cost may be reduced, and reduction in a degree of alignment of the plurality of grooves 230 may be prevented or mitigated.

Further, the wavelength of the light absorbed by the plurality of grooves 230 of the pixel electrode 226 and the common electrode 228 may be controlled by the change of the average dielectric constant due to re-alignment of the liquid crystal molecule 266 in the liquid crystal capsule 262 of the liquid crystal layer 260 to increase the response speed.

In addition, since the liquid crystal layer 260 may be formed on the second substrate 240 of a film type through a soluble process, and the second substrate 240 having the liquid crystal layer 260 may be attached to the first substrate 220 having the pixel electrode 226 and the common electrode 228, a fabrication process may be further simplified.

Moreover, since an additional process for forming the plurality of grooves 230 is not needed, a fabrication process may be further simplified.

While the pixel electrode and the common electrode are illustrated as constituting the plurality of grooves in the second example embodiment, a plurality of grooves may be formed on a surface of a pixel electrode and a common electrode in another embodiment.

Figure 5:
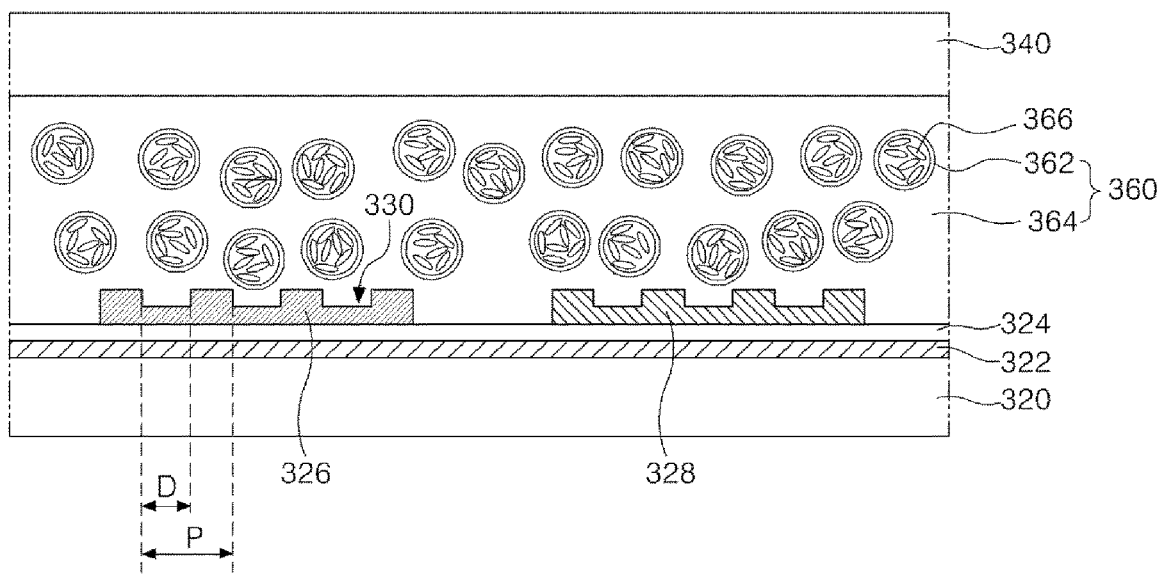
FIG. 5 is a cross-sectional view showing a liquid crystal display device including a liquid crystal capsule according to a third example embodiment of the present disclosure.

FIG. 5 is a cross-sectional view showing a liquid crystal display device including a liquid crystal capsule according to a third example embodiment of the present disclosure. Illustrations for the same part as the first or second example embodiments may be omitted.

In FIG. 5, a liquid crystal display (LCD) device 310 including a liquid crystal capsule according to a third example embodiment of the present disclosure may include first and second substrates 320 and 340, and a liquid crystal layer 360 including a plurality of liquid crystal capsules 362 between the first and second substrates 320 and 340.

A reflecting layer 322 may be disposed on an inner surface of the first substrate 320, and an insulating layer 324 may be disposed on the reflecting layer 322.

The reflecting layer 322 may include a metallic material having a relatively high reflectance, such as aluminum (Al). The insulating layer 324 may include an inorganic insulating material, such as silicon oxide ($SiO_2$) and silicon nitride (SiNx), or an organic insulating material, such as benzocyclobutene (BCB) and photoacryl.

A pixel electrode 326 and a common electrode 328 spaced apart from each other may be disposed on the insulating layer 324.

A plurality of grooves 330 of a nano size having a periodicity may be formed on a top surface of each of the pixel electrode 326 and the common electrode 328. The plurality of grooves 330 may be periodically spaced apart from each other along four or more directions to have a diameter D and a period P of several hundred nanometers in a plan view.

The pixel electrode 326 and the common electrode 328 having the plurality of grooves 330 may be formed through a single photolithographic process using a half-transmissive mask.

The pixel electrode 326 and the common electrode 328 may include a metallic material having a relatively high reflectance, such as aluminum (Al).

Each of the pixel electrode 326 and the common electrode 328 may have a bar shape in a plan view, and a horizontal electric field may be generated between the pixel electrode 326 and the common electrode 328 due to application of a voltage.

The liquid crystal layer 360 may include a plurality of liquid crystal capsules 362 and a binder 364 in which the plurality of liquid crystal capsules 362 are dispersed. Each of the plurality of liquid crystal capsules 362 may include a plurality of liquid crystal molecules 366.

The liquid crystal layer 360 may be formed through a soluble process including coating, drying, and curing of a liquid crystal capsule solution including the plurality of liquid crystal capsules 362.

The second substrate 340 may include a glass or a film. For example, after the liquid crystal layer 360 is formed on the second substrate 340 of a film type through a soluble process, the LCD device 310 may be completed by attaching the second substrate 340 having the liquid crystal layer 360 to the first substrate 320 having the pixel electrode 326 and the common electrode 328.

Here, since the liquid crystal layer 360 including the plurality of liquid crystal capsules 362 may be formed without an additional alignment layer, the liquid crystal layer 360 including the plurality of liquid crystal capsules 362 may directly contact the pixel electrode 326, the common electrode 328, and the second substrate 340.

In another example embodiment, the LCD device 310 may include the first substrate 320 and the liquid crystal layer 360 without the second substrate 340.

Although not shown, the plurality of liquid crystal molecules 366 in the plurality of liquid crystal capsules 362 of the liquid crystal layer 360 may be randomly aligned in an OFF state, and may be uniformly aligned in an ON state.

Here, since the wavelength $\lambda(ON)$ of a light absorbed by the plurality of grooves 330 of the pixel electrode 326 and the common electrode 328 of the LCD device 310 in the ON state and the wavelength $\lambda(OFF)$ of a light absorbed by the plurality of grooves 330 of the pixel electrode 326 and the common electrode 328 of the LCD device 310 in the OFF state are different from each other, a wavelength of the light absorbed by the plurality of grooves 330 of the pixel electrode 326 and the common electrode 328 may be changed according to the voltage applied to the liquid crystal layer 360.

As a result, in the LCD device 310 including the liquid crystal capsule 362 according to the third example embodiment, the wavelength band of the light reflecting on the pixel electrode 326, the common electrode 328, and the reflecting layer 322 may be controlled by the voltage applied to the pixel electrode 326 and the common electrode 328 to display a color image.

In the LCD device 310 including the liquid crystal capsule 362 according to a third example embodiment of the present disclosure, the liquid crystal layer 360 may be disposed on the pixel electrode 326 and the common electrode 328 having the plurality of grooves 330 on the surface thereof.

The average dielectric constant of the liquid crystal layer 360 may be controlled by the voltage applied to the pixel electrode 326 and the common electrode 328 to display a color image.

Since an alignment layer may be omitted, a fabrication process may be simplified, a fabrication cost may be reduced, and reduction in a degree of alignment of the plurality of grooves 330 may be prevented or mitigated.

Further, the wavelength of the light absorbed by the plurality of grooves 330 of the pixel electrode 326 and the common electrode 328 may be controlled by the change of the average dielectric constant due to re-alignment of the liquid crystal molecule 366 in the liquid crystal capsule 362 of the liquid crystal layer 360 to increase the response speed.

In addition, since the liquid crystal layer 360 may be formed on the second substrate 340 of a film type through a soluble process, and the second substrate 340 having the liquid crystal layer 360 may be attached to the first substrate 320 having the pixel electrode 326 and the common electrode 328, a fabrication process may be further simplified.

While the liquid crystal layer including the plurality of liquid crystal capsules is shown as formed between the first and second substrates in the third example embodiment, a liquid crystal layer including a plurality of liquid crystal capsules may be formed on a first substrate without a second substrate in another embodiment.

Figure 6:
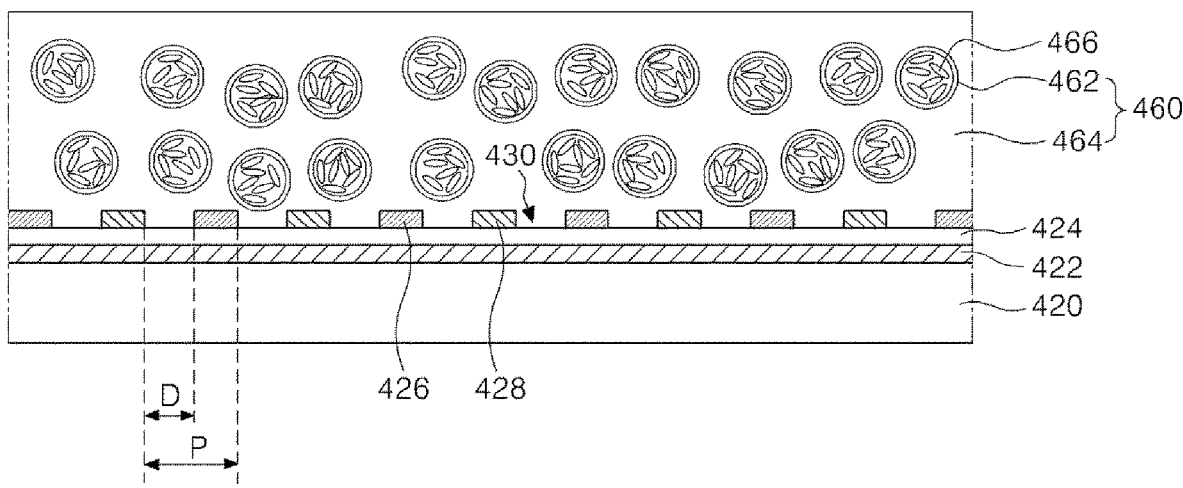
FIG. 6 is a cross-sectional view showing a liquid crystal display device including a liquid crystal capsule according to a fourth example embodiment of the present disclosure.

FIG. 6 is a cross-sectional view showing a liquid crystal display device including a liquid crystal capsule according to a fourth example embodiment of the present disclosure. Illustrations for the same part as any of the first to third embodiments may be omitted.

In FIG. 6, a liquid crystal display (LCD) device 410 including a liquid crystal capsule according to a fourth example embodiment of the present disclosure may include a first substrate 420 and a liquid crystal layer 460 including a plurality of liquid crystal capsules 462 on the first substrate 420.

A reflecting layer 422 may be disposed on the first substrate 420, and an insulating layer 424 may be disposed on the reflecting layer 422.

The reflecting layer 422 may include a metallic material having a relatively high reflectance, such as aluminum (Al). The insulating layer 424 may include an inorganic insulating material, such as silicon oxide ($SiO_2$) and silicon nitride (SiNx), or an organic insulating material, such as benzocyclobutene (BCB) and photoacryl.

A pixel electrode 426 and a common electrode 428 spaced apart from each other may be disposed on the insulating layer 424.

The pixel electrode 426, the common electrode 428, and the insulating layer 424 may constitute a plurality of grooves 430 of a nano size having a periodicity. The plurality of grooves 430 may be periodically spaced apart from each other along four or more directions to have a diameter D and a period P of several hundred nanometers in a plan view.

The pixel electrode 426 and the common electrode 428 may include a metallic material having a relatively high reflectance, such as aluminum (Al).

Each of the pixel electrode 426 and the common electrode 428 may have a bar shape in a plan view, and a horizontal electric field may be generated between the pixel electrode 426 and the common electrode 428 due to application of a voltage.

The liquid crystal layer 460 may include a plurality of liquid crystal capsules 462 and a binder 464 in which the plurality of liquid crystal capsules 462 are dispersed. Each of the plurality of liquid crystal capsules 462 may include a plurality of liquid crystal molecules 466.

The liquid crystal layer 460 may be formed through a soluble process including coating, drying, and curing of a liquid crystal capsule solution including the plurality of liquid crystal capsules 462.

Here, since the liquid crystal layer 460 including the plurality of liquid crystal capsules 462 may be formed without an additional alignment layer, the liquid crystal layer 460 including the plurality of liquid crystal capsules 462 may directly contact the pixel electrode 426 and the common electrode 428.

Although not shown, the plurality of liquid crystal molecules 466 in the plurality of liquid crystal capsules 462 of the liquid crystal layer 460 may be randomly aligned in an OFF state, and may be uniformly aligned in an ON state.

Here, since the wavelength $\lambda(ON)$ of a light absorbed by the plurality of grooves 430 of the pixel electrode 426 and the common electrode 428 of the LCD device 410 in the ON state and the wavelength $\lambda(OFF)$ of a light absorbed by the plurality of grooves 430 of the pixel electrode 426 and the common electrode 428 of the LCD device 410 in the OFF state are different from each other, a wavelength of the light absorbed by the plurality of grooves 430 of the pixel electrode 426 and the common electrode 428 may be changed according to the voltage applied to the liquid crystal layer 460.

As a result, in the LCD device 410 including the liquid crystal capsule 462 according to a fourth example embodiment, the wavelength band of the light reflecting on the pixel electrode 426, the common electrode 428, and the reflecting layer 422 may be controlled by the voltage applied to the pixel electrode 426 and the common electrode 428 to display a color image.

In the LCD device 410 including the liquid crystal capsule 462 according to a fourth example embodiment of the present disclosure, the liquid crystal layer 460 may be disposed on the pixel electrode 426, the common electrode 428, and the insulating layer 424 constituting the plurality of grooves 430. The average dielectric constant of the liquid crystal layer 460 may be controlled by the voltage applied to the pixel electrode 426 and the common electrode 428 to display a color image.

Since an alignment layer may be omitted, a fabrication process may be simplified, a fabrication cost may be reduced, and reduction in a degree of alignment of the plurality of grooves 430 may be prevented or mitigated.

Further, the wavelength of the light absorbed by the plurality of grooves 430 of the pixel electrode 426 and the common electrode 428 may be controlled by the change of the average dielectric constant due to re-alignment of the liquid crystal molecule 466 in the liquid crystal capsule 462 of the liquid crystal layer 460 to increase the response speed.

In addition, since the LCD device 410 may include the first substrate 420 and the liquid crystal layer 410 without a second substrate, a fabrication process may be further simplified and an applicability to an outdoor product, such as an electronic board on a building, may be improved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

It will be apparent to those skilled in the art that various modifications and variations can be made in a liquid crystal display device and a method of fabricating the liquid crystal display device of the present disclosure without departing from the technical idea or scope of the disclosure. Thus, it is intended that the present disclosure cover the modifications and variations of this disclosure, provided that they come within the scope of the appended claims and their equivalents.

What is claimed is:

1. A liquid crystal display device, comprising:
   a first substrate;
   a plurality of grooves periodically spaced apart from each other over the first substrate;
   a pixel electrode and a common electrode spaced apart from each other over the first substrate; and
   a liquid crystal layer including a plurality of liquid crystal capsules on the grooves,
   wherein the plurality of grooves are filled with the liquid crystal layer,
   wherein the plurality of grooves absorb an incident light, and
   wherein a wavelength of the incident light absorbed by the plurality of grooves is changed according to a voltage applied to the liquid crystal layer due to a coupling of an electric field of the incident light and a plasmon of the plurality of grooves.

2. A liquid crystal display device, comprising:
   a first substrate;
   a plurality of grooves periodically spaced apart from each other over the first substrate;
   a pixel electrode and a common electrode spaced apart from each other over the first substrate;
   a liquid crystal layer including a plurality of liquid crystal capsules on the grooves,
   a metal layer on the first substrate; and
   a second substrate on the liquid crystal layer,
   wherein the plurality of grooves are filled with the liquid crystal layer,
   wherein the grooves are formed on a surface of the metal layer, and
   wherein the pixel electrode and the common electrode are disposed between the second substrate and the liquid crystal layer.

3. The liquid crystal display device of claim 1, further comprising:
   a reflecting layer on the first substrate; and
   an insulating layer on the reflecting layer,
   wherein the pixel electrode and the common electrode are disposed over the insulating layer, and
   wherein the reflecting layer is exposed through a gap space between the pixel electrode and the common electrode.

4. The liquid crystal display device of claim 3, wherein spaces between the pixel electrode, the common electrode, and the insulating layer form the grooves.

5. The liquid crystal display device of claim 4, further comprising a second substrate over the liquid crystal layer.

6. A liquid crystal display device, comprising:
   a first substrate;
   a plurality of grooves periodically spaced apart from each other over the first substrate;
   a pixel electrode and a common electrode spaced apart from each other over the first substrate;
   a liquid crystal layer including a plurality of liquid crystal capsules on the grooves;
   a reflecting layer on the first substrate; and an insulating layer on the reflecting layer,
wherein the plurality of grooves are filled with the liquid crystal layer,
wherein the pixel electrode and the common electrode are disposed over the insulating layer,
wherein concave portions and convex portions are formed on a top surface of each of the pixel electrode and the common electrode such that the concave portions and the convex portions form the grooves.

7. The liquid crystal display device of claim 6, further comprising a second substrate over the liquid crystal layer.

8. The liquid crystal display device of claim 1, wherein each of the liquid crystal capsules includes a plurality of liquid crystal molecules, and
wherein the liquid crystal molecules are randomly or uniformly aligned according to a voltage applied to the pixel electrode and the common electrode.

9. A method of fabricating a liquid crystal display device, comprising:
forming a conductive layer having a plurality of grooves periodically spaced apart from each other over a first substrate; and
forming a liquid crystal layer including a plurality of liquid crystal capsules on the conductive layer, one or more of the liquid crystal capsules having a plurality of liquid crystal molecules,
wherein the plurality of grooves are filled with the liquid crystal layer,
wherein the plurality of grooves absorb an incident light, and
wherein a wavelength of the incident light absorbed by the plurality of grooves is changed according to a voltage applied to the liquid crystal layer due to a coupling of an electric field of the incident light and a plasmon of the plurality of grooves.

10. The method of claim 9, wherein forming the liquid crystal layer includes coating, drying, and curing a liquid crystal capsule solution.

11. The method of claim 10, wherein forming the liquid crystal layer includes:
forming the liquid crystal layer on a second substrate; and
combining the second substrate with the liquid crystal layer with the first substrate with the conductive layer so that the liquid crystal layer is between the conductive layer and the second substrate.

12. A liquid crystal display apparatus, comprising:
a first substrate;
a conductive layer over the first substrate and having a plurality of grooves periodically spaced apart from each other; and
a liquid crystal layer including a plurality of liquid crystal capsules over the conductive layer, one or more of the liquid crystal capsules having a plurality of liquid crystal molecules,
wherein the plurality of grooves are filled with the liquid crystal layer,
wherein the plurality of grooves absorb an incident light, and
wherein a wavelength of the incident light absorbed by the plurality of grooves is changed according to the voltage applied to the liquid crystal layer due to a coupling of an electric field of the incident light and a plasmon of the plurality of grooves.

13. The liquid crystal display apparatus of claim 12, wherein the grooves are periodically spaced apart from one another in four or more directions.

14. The liquid crystal display apparatus of claim 12, wherein the grooves have both a diameter and a period smaller than 1 micron.

15. The liquid crystal display apparatus of claim 12, wherein the liquid crystal layer is directly on the conductive layer.

16. The liquid crystal display apparatus of claim 12, wherein the liquid crystal layer further includes a binder in which the liquid crystal capsules are dispersed.

17. A liquid crystal display apparatus, comprising:
a first substrate;
a conductive layer over the first substrate and having a plurality of grooves periodically spaced apart from each other;
a liquid crystal layer including a plurality of liquid crystal capsules over the conductive layer, one or more of the liquid crystal capsules having a plurality of liquid crystal molecules;
a pixel electrode and a common electrode over the liquid crystal layer; and
a second substrate over the pixel electrode and the common electrode,
wherein the plurality of grooves are filled with the liquid crystal layer.

18. The liquid crystal display apparatus of claim 12, further comprising:
a reflecting layer over the first substrate; and
an insulating layer over the reflecting layer,
wherein the conductive layer is over the insulating layer.

19. The liquid crystal display apparatus of claim 18, wherein the conductive layer comprises a plurality of pixel electrodes and a plurality of common electrodes periodically spaced apart from one another over the insulating layer, spaces between the pixel electrodes and the common electrodes over the insulating layer forming the grooves.

20. A liquid crystal display apparatus, comprising:
a first substrate;
a conductive layer over the first substrate and having a plurality of grooves periodically spaced apart from each other;
a liquid crystal layer including a plurality of liquid crystal capsules over the conductive layer, one or more of the liquid crystal capsules having a plurality of liquid crystal molecules;
a reflecting layer over the first substrate; and
an insulating layer over the reflecting layer;
wherein the plurality of grooves are filled with the liquid crystal layer,
wherein the conductive layer is over the insulating layer,
wherein the conductive layer comprises a pixel electrode and a common electrode over the insulating layer, and
wherein concave portions and convex portions are formed on a top surface of each of the pixel electrode and the common electrode facing the liquid crystal layer such that the concave portions and the convex portions form the grooves.

* * * * *